United States Patent
Xu et al.

(10) Patent No.: US 12,050,362 B2
(45) Date of Patent: Jul. 30, 2024

(54) LENS PRISM MODULE

(71) Applicant: Changzhou AAC Raytech Optronics Co., Ltd., Changzhou (CN)

(72) Inventors: Tongming Xu, Shenzhen (CN); Gang Li, Shenzhen (CN)

(73) Assignee: CHANGZHOU AAC RAYTECH OPTRONICS CO., LTD., Changzhou (CN)

( * ) Notice: Subject to any disclaimer, the term of this patent is extended or adjusted under 35 U.S.C. 154(b) by 481 days.

(21) Appl. No.: 17/530,492

(22) Filed: Nov. 19, 2021

(65) Prior Publication Data

US 2022/0163761 A1    May 26, 2022

(30) Foreign Application Priority Data

Nov. 24, 2020   (CN) .......................... 202022731773.0

(51) Int. Cl.
    *G02B 7/18*     (2021.01)
    *G02B 7/08*     (2021.01)
    *H04N 23/54*    (2023.01)
    *H04N 23/68*    (2023.01)

(52) U.S. Cl.
    CPC ............. *G02B 7/1805* (2013.01); *G02B 7/08* (2013.01); *H04N 23/54* (2023.01); *H04N 23/687* (2023.01)

(58) Field of Classification Search
    None
    See application file for complete search history.

(56) References Cited

FOREIGN PATENT DOCUMENTS

CN        111142319 A  *  5/2020  ........... G02B 7/1805

* cited by examiner

*Primary Examiner* — Bao-Luan Q Le
*Assistant Examiner* — Danell L Owens
(74) *Attorney, Agent, or Firm* — W&G Law Group

(57) ABSTRACT

A lens prism module relates to the field of shooting equipment and includes a fixed base, a rotating base, a mounting base, a prism, and a driving assembly. The rotating base includes rotating shafts rotatably connected with the fixed base and a connecting shaft rotatably connected with the mounting base. An axis of the connecting shaft is perpendicular to an axis of each rotating shaft. An accommodating groove accommodating the connecting shaft is provided on the mounting base. Positioning holes are on a top surface and a bottom surface of the accommodating groove. Two ends of the connecting shaft are separately rotatably disposed on a corresponding positioning hole. On a premise of realizing rotation of the mounting base, a part of the connecting shaft is hidden in the accommodating groove to reduce a volume of an overall structure of the lens prism module, thereby realizing requirements of miniaturization design.

10 Claims, 9 Drawing Sheets

LENS PRISM MODULE

CROSS-REFERENCE TO RELATED APPLICATION

Technical Field

The present disclosure relates to the field of shooting equipment, and in particular to a lens prism module.

BACKGROUND

With improvement of living standards, development of imaging technology and widely applications of products with imaging functions, optical lenses are applied to various electronic products, such as digital cameras, digital video cameras, and smart shooting equipment.

A lens prism module in the related art comprises a fixed base, a rotating base, a mounting base disposed on the rotating base, a prism disposed on the mounting base, a rotating connecting structure for rotatably connecting the rotating base and the mounting base, and a driving assembly for driving. In order to realize rotation of the mounting base, the rotating connecting structure is directly disposed between the rotating base and the mounting base, which increases a volume of an overall structure of the lens prism module and does not meet requirements of miniaturized design.

SUMMARY

The present disclosure provides a lens prism module to solve a problem that a conventional lens prism module is large in volume and does not meet requirements of miniaturization design.

Embodiments of the present disclosure is realized by providing a lens prism module. The lens prism module comprises a fixed base, a rotating base rotatably connected with the fixed base, a mounting base rotatably connected with the rotating base, a prism disposed on the mounting base, and a driving assembly for driving the rotating base and mounting base to rotate. The rotating base comprises rotating shafts rotatably connected with the fixed base and a connecting shaft rotatably connected with the mounting base. An axis of the connecting shaft and an axis of each of the rotating shafts are perpendicular to each other. An accommodating groove for accommodating the connecting shaft is provided on one side of the mounting base. Positioning holes are on a top surface and a bottom surface of the accommodating groove. Two ends of the connecting shaft are separately rotatably disposed on a corresponding positioning hole.

As an improvement, a positioning block is detachably disposed on the bottom surface of the accommodating groove. One of the positioning holes on the bottom surface of the accommodating groove is on the positioning block.

As an improvement, a protruding block accommodated in the accommodating groove is disposed on one side of the rotating base. A limiting groove is provided on the protruding block. The connecting shaft is disposed in the limiting groove.

As an improvement, the lens prism module further comprises a first return magnet disposed on the fixed base and a magnetic yoke disposed on the rotating base. The first return magnet is disposed opposite to the magnetic yoke. The first return magnet and the magnetic yoke are accommodated in the accommodating groove.

As an improvement, the first return magnet is disposed in the mounting base. The magnetic yoke is disposed opposite to the protruding block.

As an improvement, the lens prism module further comprises second return magnets disposed on the fixed base and the rotating base.

As an improvement, an avoiding groove for avoiding one end of the prism is provided on a bottom surface of the fixed base.

As an improvement, the driving assembly comprise a first driving component for driving the rotating base to rotate and second driving components for driving the fixed base to rotate. The first driving component comprises a first driving coil and a first driving magnet.

As an improvement, the second driving components comprise second driving coils disposed on a fixed base and second driving magnets disposed on the mounting base. The second driving coils disposed opposite to the second driving magnets.

As an improvement, the lens prism module further comprises a first Hall sensor disposed on the fixed base and a second Hall sensor disposed on the fixed base. The first Hall sensor is disposed on one side of the first driving coil. The second Hall sensor is disposed on one side of the second driving coil.

In embodiments of the present disclosure, the accommodating groove is provided on one side of the mounting base, and the positioning holes are on the top surface and the bottom surface of the accommodating groove, so that the two ends of the connecting shaft are separately rotatably disposed in the corresponding positioning hole. On a premise of realizing rotation of the mounting base, a part of the connecting shaft that is rotable is hidden in the accommodating groove, so as to reduce a volume of an overall structure of the lens prism module, thereby realizing the requirements of miniaturization design.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

In the drawings.

Figure 1:
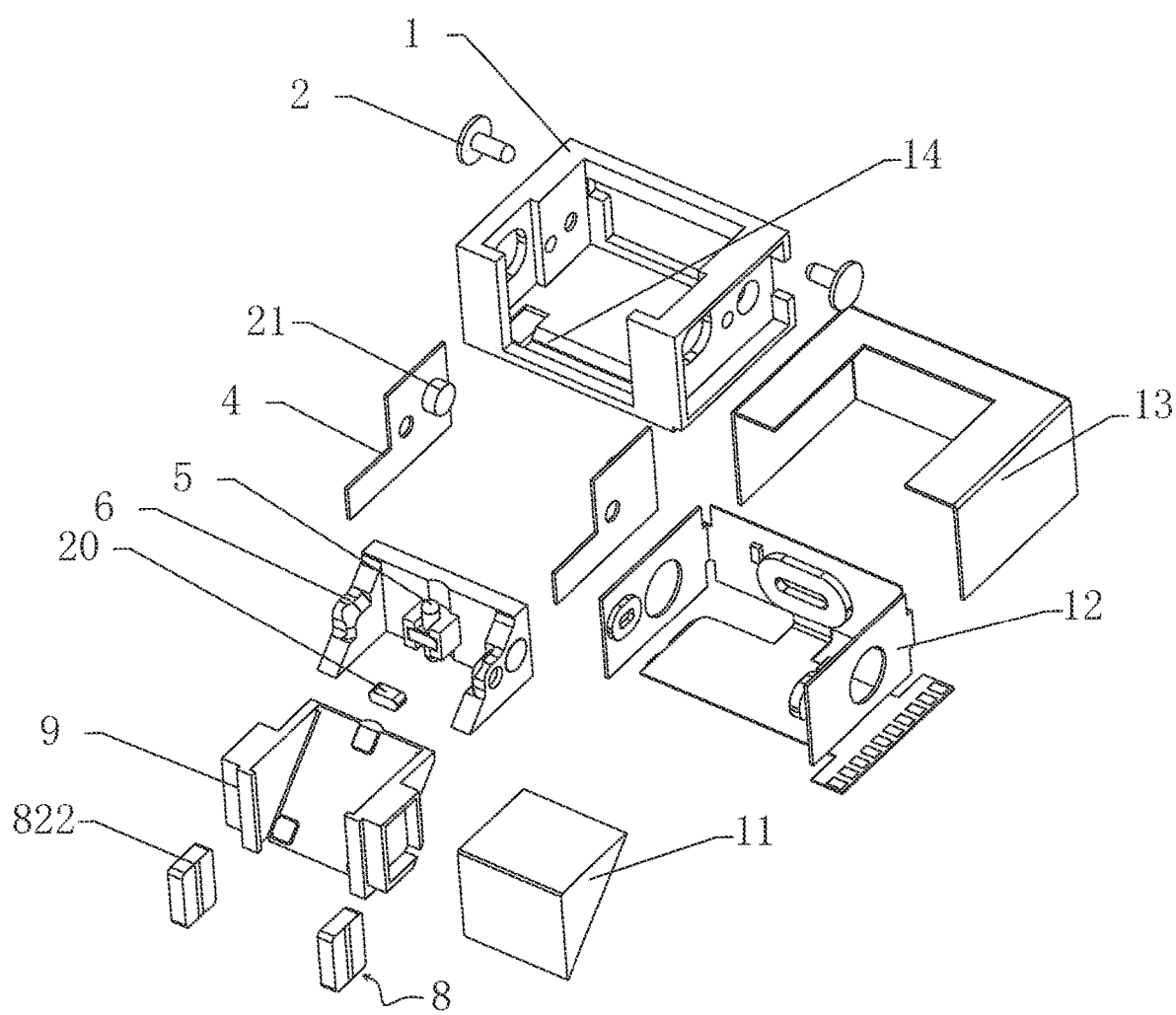
FIG. 1 is an exploded schematic diagram of a lens prism module according to one embodiment of the present disclosure.

1—fixed base; 2—rotating shaft; 3—first hall sensor; 4—magnetic baffle plate; 5—connecting shaft; 6—rotating base; 7—second hall sensor; 8—driving assembly; 81—first driving component; 811—first driving coil; 812—first driving magnet; 82—second driving component; 821—second driving coil; 822—second driving magnet; 9—mounting base; 10—first mounting groove; 11—prism; 12—circuit board; 13—housing; 14—avoiding groove 15—fixing groove; 16—reinforcing plate; 17—protruding block; 18—limiting groove; 19—magnetic yoke; 20—first return magnet; 21—second return magnet; 22—accommodating groove; 23—positioning block; 24—positioning hole; 25—second mounting groove; 26—third mounting groove.

DETAILED DESCRIPTION OF EMBODIMENTS

In order to make purposes, technical solutions, and advantages of the present disclosure clear, the following further describes the present disclosure with reference to the accompanying drawings and embodiments. It should be understood that the specific embodiments described herein are only used to explain the present disclosure and are not intend to limit the present disclosure.

As shown in FIGS. 1-9, embodiments of the present disclosure provide a lens prism module. The lens prism module comprises a fixed base 1, a rotating base 6 rotatably connected with the fixed base 1, a mounting base 9 rotatably connected with the rotating base 6, a prism 11 disposed on the mounting base 9, and a driving assembly 8 for driving the rotating base 6 and mounting base 9 to rotate. The rotating base 6 comprises rotating shafts 2 rotatably connected with the fixed base 1 and a connecting shaft 5 rotatably connected with the mounting base 9. An axis of the connecting shaft 5 and an axis of each of the rotating shafts 2 are perpendicular to each other. An accommodating groove 22 for accommodating the connecting shaft 5 is provided on one side of the mounting base 9. Positioning holes 24 are on a top surface and a bottom surface of the accommodating groove 22. Two ends of the connecting shaft 5 are separately rotatably disposed on a corresponding positioning hole. Therefore, on a premise of realizing rotation of the mounting base, a part of connecting shaft that is rotable is hidden in the accommodating groove 22, so as to reduce a volume of an overall structure of the lens prism module, thereby realizing the requirements of miniaturization design.

Figure 2:
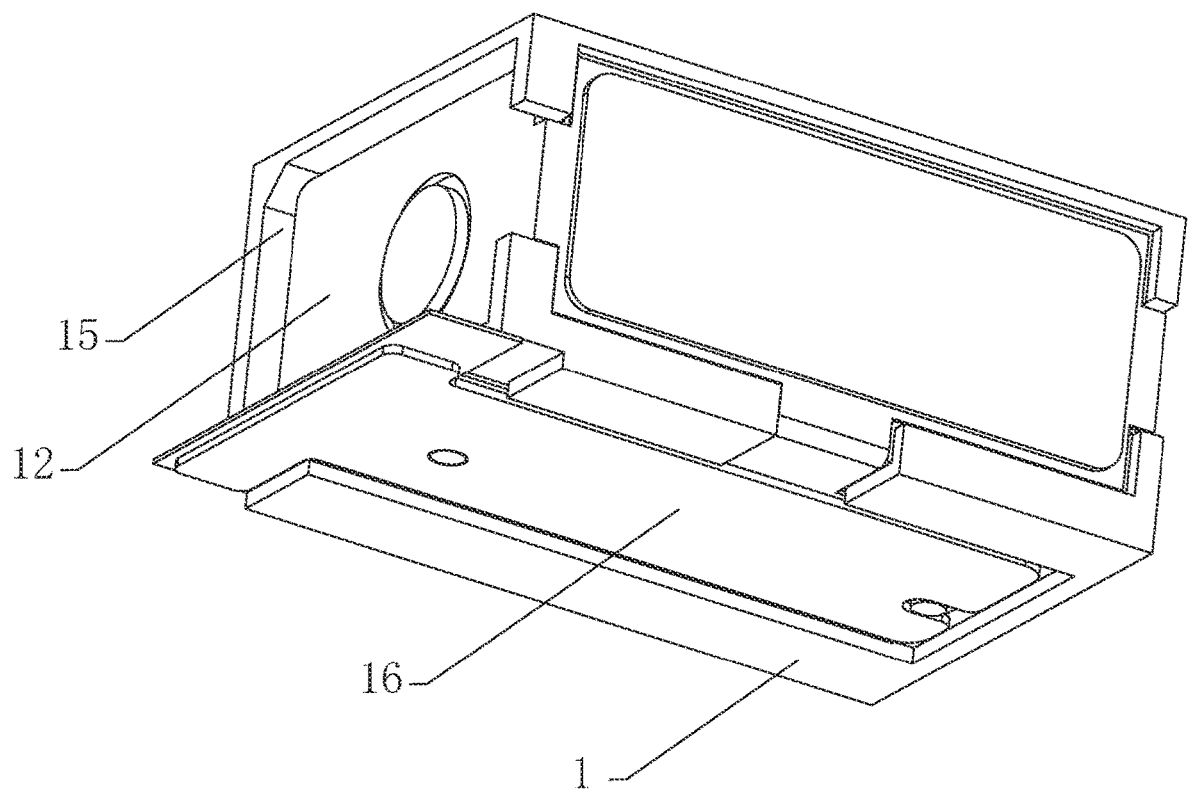
FIG. 2 is a structural schematic diagram of a fixed base and a circuit board of the lens prism module according to one embodiment of the present disclosure.

Specifically, as shown in FIG. 2, a fixed groove 15 is provided on an outer wall of the fixed base 1 and a circuit board 12 is disposed in the fixed groove 15. Therefore, the circuit board 12 is well attached to the fixed base 1 for protecting the circuit board 12.

Figure 6:
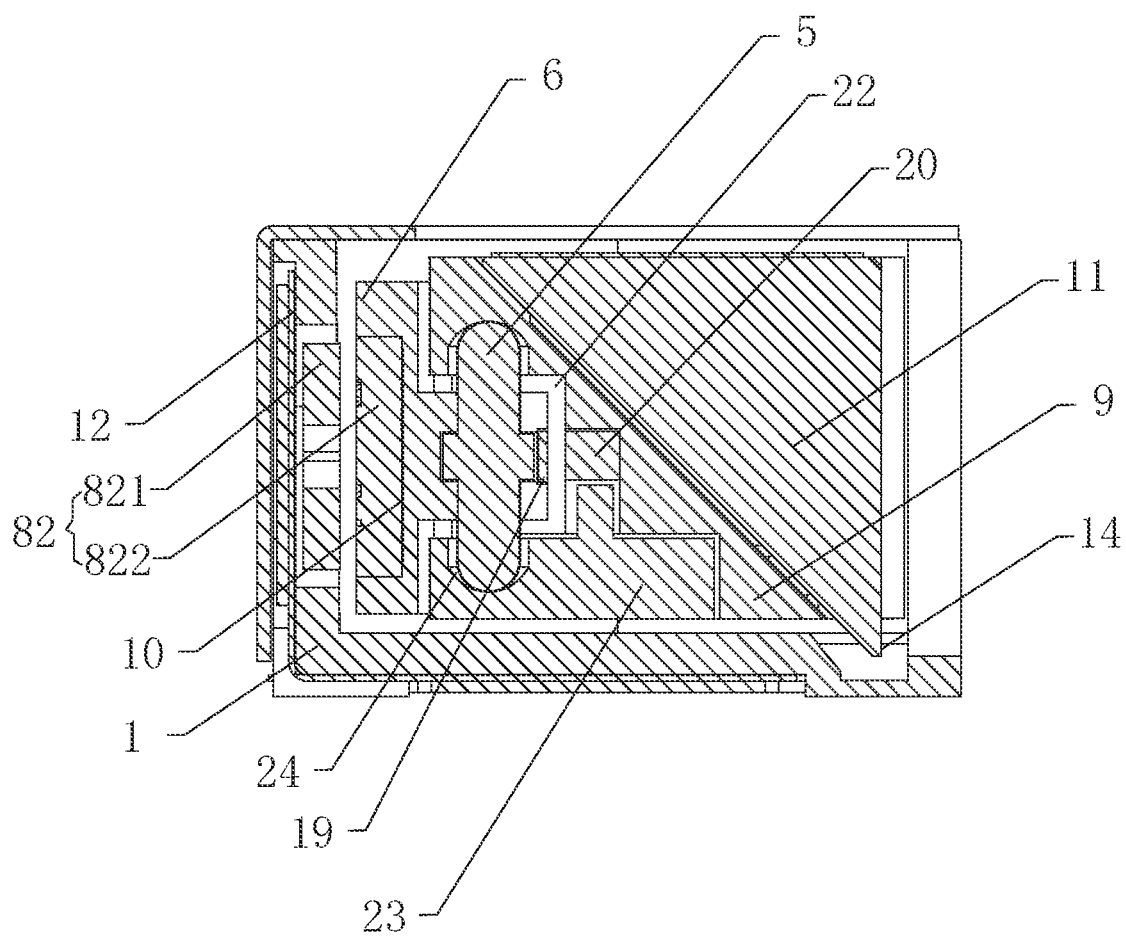
FIG. 6 is a cross-sectional schematic diagram taken along a line A-A shown in FIG. 3.

Specifically, as shown in FIG. 1 or FIG. 6, an avoiding groove 14 for avoiding one end of the prism 11 is provided on a position of the fixed base 1 corresponding to a lower end of the prism 11, so that a position of the prism is limited during mounting of the prism 11 to the mounting base 9 while a height of the fixed base 1 is reduced under a premise of ensuring the larger-sized prism, thereby reducing the volume of the overall structure of the lens prism module Specifically, as shown in FIG. 2, a reinforcing plate 16 is disposed on a bottom surface of the circuit board 12. The circuit board 12 is connected with the fixed base 1 through the reinforcing plate 16, so the circuit board 12 is fixed, the circuit board 12 is prevented from being damaged during fixing, and the circuit board 12 is protected. Of course, according to actual needs, the reinforcing plate 16 may also be disposed on one side of the circuit board 12.

Figure 3:
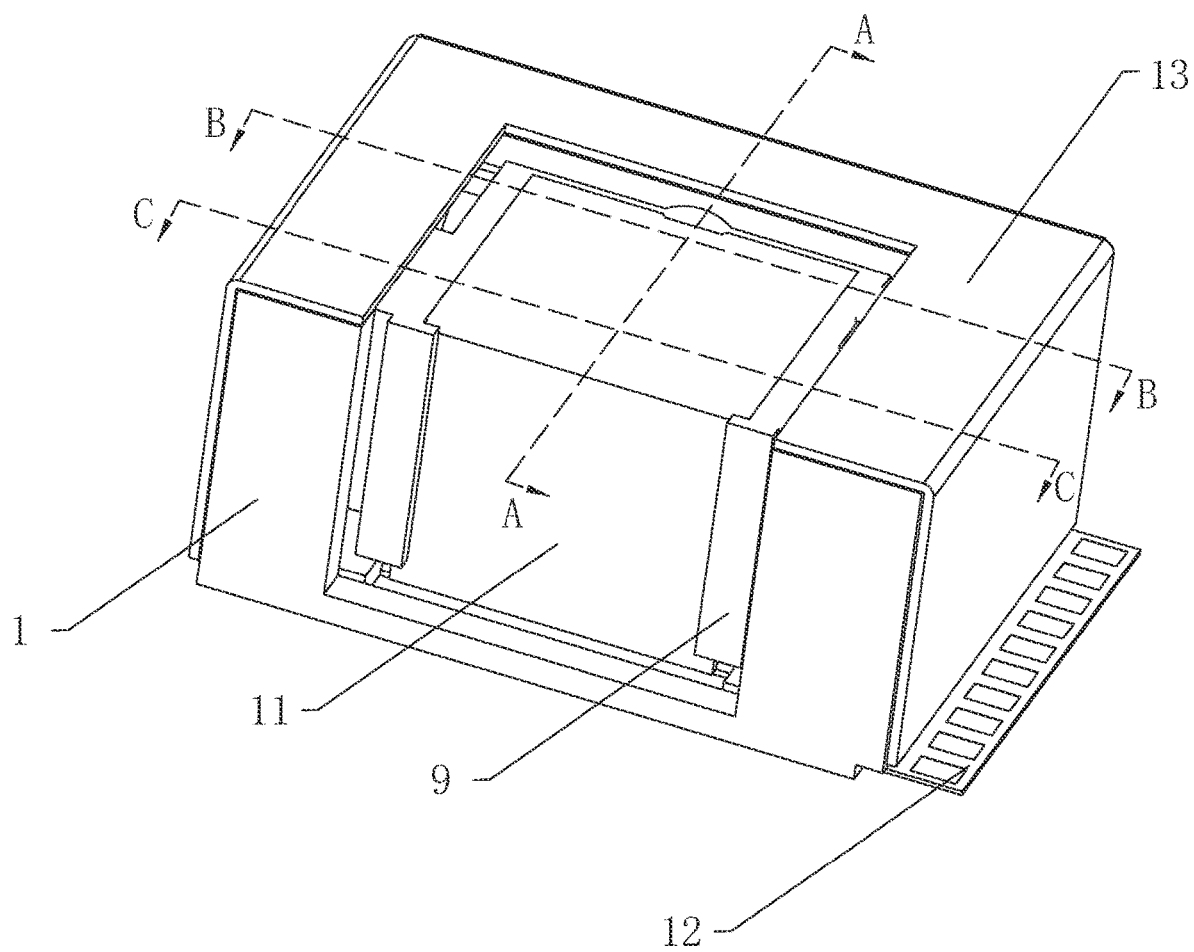
FIG. 3 is a schematic diagram showing an overall structure of the lens prism module according to one embodiment of the present disclosure.

Specifically, as shown in FIG. 3, the lens prism module further comprises a housing 13 disposed on the fixed base 1. The housing 13 covers the fixed base 1 and further protects the circuit board 12 in the fixed groove 15. Thus, the circuit board 12 is well protected and is protected from damages.

Figure 4:
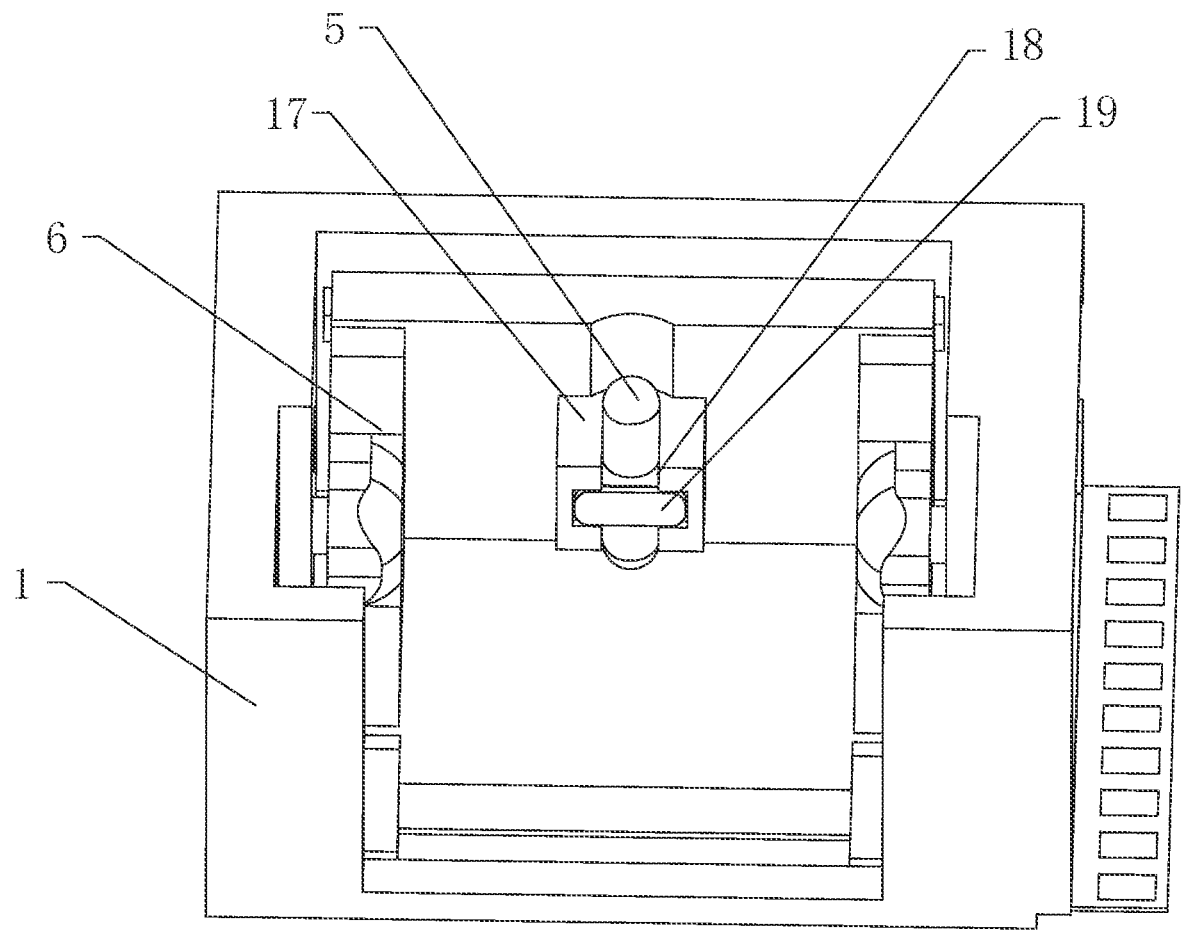
FIG. 4 is a structural schematic diagram of the fixed base and a rotating base of the lens prism module according to one embodiment of the present disclosure.
Figure 5:
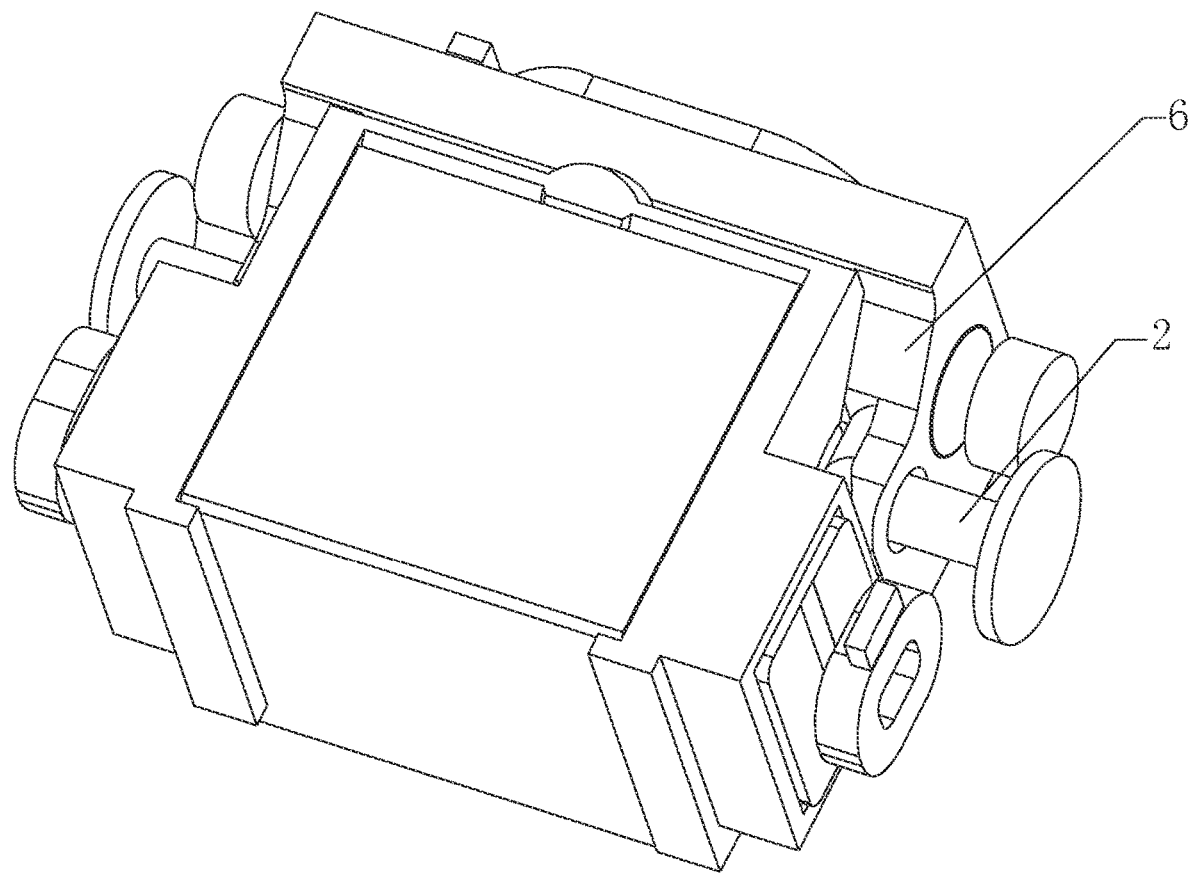
FIG. 5 is a structural schematic diagram of the fixed base and the rotating base of the lens prism module according to one embodiment of the present disclosure.

Specifically, as shown in FIG. 4 and FIG. 5, two rotating shafts 2 are separately disposed on two sides of the fixed base 1. One end of each of the rotating shafts 2 passes through the circuit board 12 to facilitate connection with the fixed base 1.

Specifically, two sides of the rotating base 6 are separately rotatably disposed on the two rotating shafts 2. That is, one side of the rotating base 6 is rotatably connected with a corresponding rotating shaft 2. Thus, the rotating base 6 rotates around the rotating shafts 2.

Specifically, as shown in FIG. 4, a protruding block 17 accommodated in the accommodating groove 22 is disposed on one side of the rotating base 6. A limiting groove 18 is provided on the protruding block 17. The connecting shaft is disposed in the limiting groove 18. By disposing the protruding block 17 and disposing the limiting groove 18 on the protruding block 17, arrangement of the connecting shaft 5 is facilitated and a pace for movement of the mounting base 9 is reserved.

Specifically, as shown in FIG. 6, the accommodating groove 22 for accommodating the protruding block 17 and the connecting shaft 5 are provided on one side of the mounting base 9. A positioning block 23 is disposed on the bottom surface of the accommodating groove 22. In one optional embodiment, the positioning block 23 is detachably disposed on the bottom surface of the accommodating groove 22, which facilitates installation and assembly of the lens prism module. One of the positioning holes 24 on the bottom surface of the accommodating groove 22 is on the positioning block 23. The other one of the positioning holes 24 is disposed on the top surface of the accommodating groove 22 corresponding to a position of the positioning block 23. The two ends of the connecting shaft 5 are separately rotatably disposed in the positioning hole 24 on the top surface of the accommodating groove 22 and the positioning hole 24 on the positioning block 23. That is, a first end of the connecting shaft 5 is rotatably disposed in the positioning hole 24 on the top surface of the accommodating groove 22 and a second end of the connecting shaft 5 is rotatably disposed in the positioning hole 24 on the positioning block 23. The accommodating groove 22 is provided on one side of the mounting base 9 for accommodating the connecting shaft 5, which not only protects the connecting shaft 5, but also saves a space occupied by the connecting shaft 5 by accommodating the connecting shaft 5. Thus, the volume of the overall structure of the lens prism module is reduced.

Specifically, as shown in FIG. 1 and FIG. 6, a slot structure (not shown in the drawings) is disposed on the mounting base 9 and the prism 11 is disposed in the slot structure. One end of the prism 11 is disposed corresponding to the avoiding groove 14. Thus, stabilizing effect of the prism 11 is enhanced, and a space required for installation of the prism 11 is reduced, so as to reduce the volume of the overall structure of the lens prism module.

Specifically, as shown in FIG. 1 and FIGS. 6-9, the driving assembly 8 comprise a first driving component 81 for driving the rotating base 6 to rotate and second driving components 82 for driving the fixed base 1 to rotate. The first driving component 81 drives the rotating base 6 to rotate. The first driving component 81 comprises a first driving coil 811 and a first driving magnet 812. When the first driving coil 811 is energized, the first driving magnet 812 drives the rotating base 6 to rotate along the rotating shafts 2.

Specifically, as shown in FIGS. 1-9, a first mounting groove 10 is provided on one side of the rotating base 6 and the first driving magnet 812 is disposed in the first mounting groove 10. Thus, installation and arrangement of the first driving magnet 812 is facilitated, and stability after installation is improved to prevent the first driving magnet 812 from falling off. When the first driving coil 811 is turned off, the first driving magnet 812 rotates the rotating base 6 to an initial position of the rotating base 6 by magnetic force.

Specifically, the second driving components 82 comprise second driving coils 821 disposed on a fixed base 1 and second driving magnets 822 disposed on the mounting base 9. The second driving coils 821 disposed opposite to the second driving magnets 822.

Two second driving coils 821 are separately disposed on two sides of the circuit board 12. Two second driving magnets 822 are disposed on two sides of the mounting base 9 and correspond to the two second driving coils 821 respectively. When the two second driving coils 821 are energized, the two second driving magnets 822 drive the mounting base 9 to rotate along the connecting shaft 5.

Figure 7:
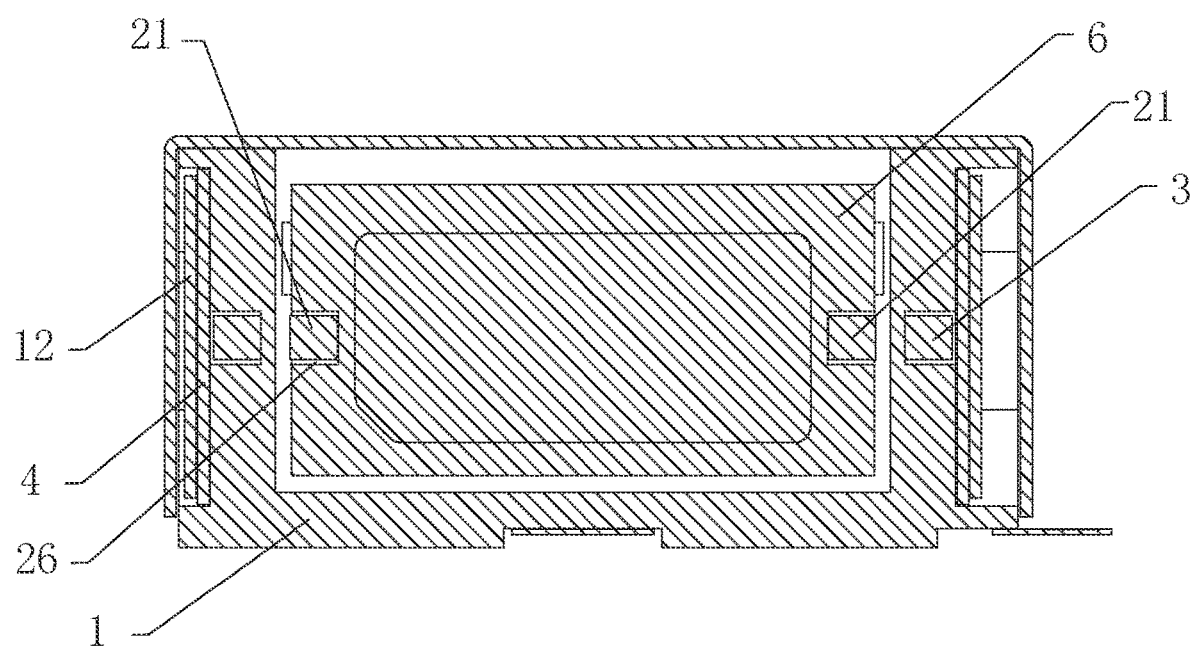
FIG. 7 is a cross-sectional schematic diagram taken along a line B-B shown in FIG. 3.
Figure 8:
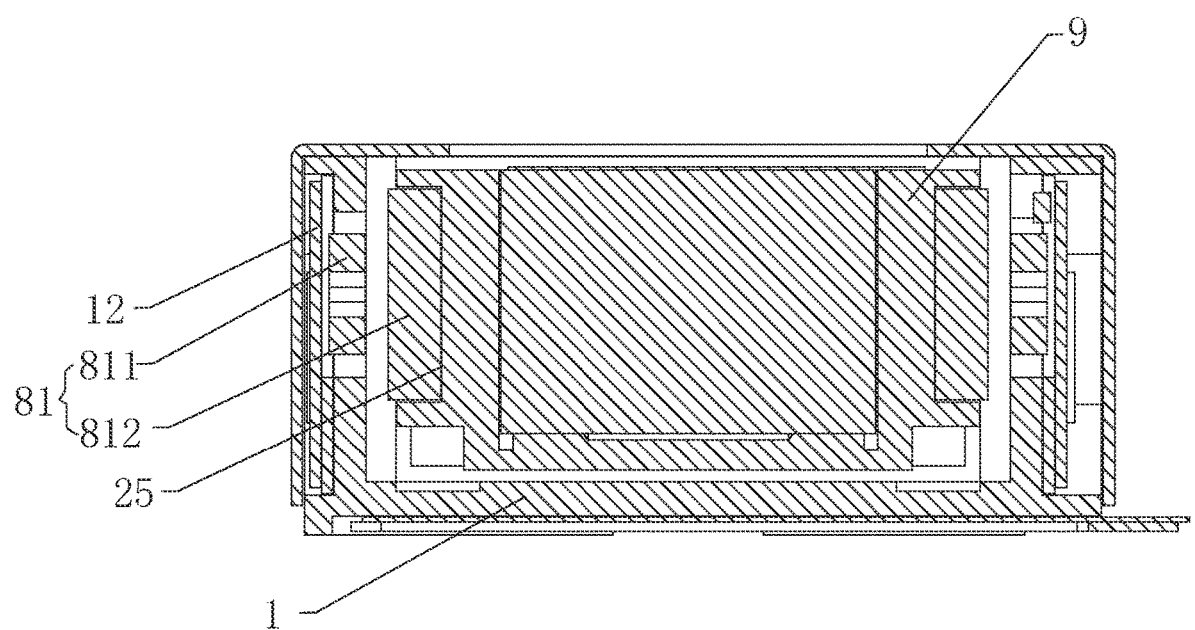
FIG. 8 is a cross-sectional schematic diagram taken along a line C-C shown in FIG. 3.

Specifically, as shown in FIGS. 6-8, two second mounting grooves 25 are separately provided on two sides of the mounting base 9, and the two second driving magnets 822 are separately disposed in the two second mounting grooves 25, which facilitates installation of the second driving magnets 822, improves stability of the two second driving magnets 822 after installation, and prevent the two second driving magnets 822 from falling off.

Specifically, as shown in FIGS. 1, 4, and 6, the lens prism module further comprises a first return magnet 20 disposed on the fixed base 1 and a magnetic yoke 19 disposed on the rotating base 6. The first return magnet 20 is disposed opposite to the magnetic yoke 19. The first return magnet 20 and the magnetic yoke 19 are accommodated in the accommodating groove 22. When the two second driving coils 821 are turned off and energized, since the connecting shaft 5 is rotatably connected with the magnetic yoke 19, the first return magnet 20 and the magnetic yoke 19 rotate the mounting base 9 to an initial position of the mounting base 9. The first return magnet 20 is disposed in the accommodating groove 22, which improves stability of the first return magnet 20 after installation and prevents the first return magnet 20 from falling off. The first return magnet 20 is disposed in the mounting base 9, and the magnetic yoke 19 is disposed opposite to the protruding block 17. A groove structure communicating with the limiting groove 18 is provided on the protruding block 17. The magnetic yoke 19 is fixedly disposed on the groove structure to increase stability and facilitate cooperation with the first return magnet 7.

Specifically, as shown in FIGS. 1 and 7, the lens prism module further comprises second return magnets 21 disposed on the fixed base 1 and the rotating base 6.

Specifically, the lens prism module further comprises magnetic baffle plates 4 disposed on two sides of the circuit board 12, and the two second return magnets 21 are separately disposed on an inner side of a corresponding magnetic baffle plate 4. The two magnetic baffle plates 4 can effectively Perform magnetic isolation.

Specifically, as shown in FIG. 7, third mounting grooves 26 are provided on two sides of the rotating base 6, and the second return magnets 21 are disposed in the third mounting grooves 26, which facilitates installation of the second return magnets 21, and improves stability of the second return magnets 21 after installation and prevent the second return magnets 21 from falling off.

Figure 9:
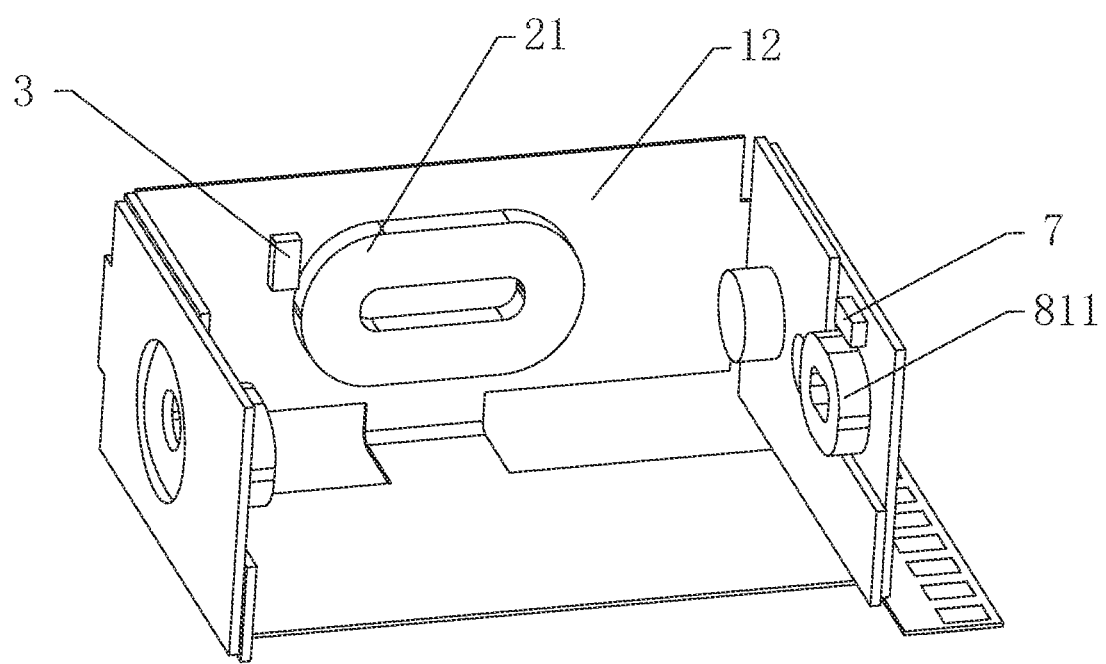
FIG. 9 is a structural schematic diagram of the circuit board of the lens prism module according to one embodiment of the present disclosure.

Specifically, as shown in FIG. 9, the lens prism module further comprises a first Hall sensor 3 disposed on the fixed base and a second Hall sensor 7 disposed on the fixed base. The first Hall sensor 3 is disposed on one side of the first driving coil 811. The second Hall sensor 7 is disposed on one side of the second driving coils 821. Thus, rotating angles of the rotating base 6 and the mounting base 9 are easily and accurately obtained, so as to well adjust the rotating angles of the rotating base 6 and the mounting base 9.

In the embodiments of the present disclosure, the accommodating groove 22 is provided on one side of the mounting base 9, and the positioning holes 24 are on the top surface and the bottom surface of the accommodating groove 22, so the two ends of the connecting shaft 5 are separately rotatably disposed in the corresponding positioning hole 24. Thus, on a premise of realizing rotation of the mounting base 9, the part of the connecting shaft that is rotable is hidden in the accommodating groove 22, so as to reduce the volume of the overall structure of the lens prism module, thereby realizing the requirements of miniaturization design.

Foregoing descriptions are only optional embodiments of the present disclosure and are not intended to limit the present disclosure. Any modification, equivalent replacement, or improvement within spirit and principle of the present disclosure should be included in the protection scope of the present disclosure.

What is claimed is:

1. A lens prism module, comprising:
a fixed base;
a rotating base rotatably connected with the fixed base;
a mounting base rotatably connected with the rotating base;
a prism disposed on the mounting base; and
a driving assembly for driving the rotating base and mounting base to rotate;
wherein the rotating base comprises rotating shafts rotatably connected with the fixed base and a connecting shaft rotatably connected with the mounting base; an axis of the connecting shaft and an axis of each of the rotating shafts are perpendicular to each other;
wherein an accommodating groove for accommodating the connecting shaft is provided on one side of the mounting base; positioning holes are on a top surface and a bottom surface of the accommodating groove; two ends of the connecting shaft are separately rotatably disposed on a corresponding positioning hole.

2. The lens prism module according to claim 1, wherein a positioning block is detachably disposed on the bottom surface of the accommodating groove; one of the positioning holes on the bottom surface of the accommodating groove is on the positioning block.

3. The lens prism module according to claim 1, wherein a protruding block accommodated in the accommodating groove is disposed on one side of the rotating base; a limiting groove is provided on the protruding block; the connecting shaft is disposed in the limiting groove.

4. The lens prism module according to claim 3, wherein the lens prism module further comprises a first return magnet disposed on the fixed base and a magnetic yoke disposed on the rotating base; the first return magnet is disposed opposite to the magnetic yoke; the first return magnet and the magnetic yoke are accommodated in the accommodating groove.

5. The lens prism module according to claim 4, wherein the first return magnet is disposed in the mounting base; the magnetic yoke is disposed opposite to the protruding block.

6. The lens prism module according to claim 4, wherein the lens prism module further comprises second return magnets disposed on the fixed base and the rotating base.

7. The lens prism module according to claim 1, wherein an avoiding groove for avoiding one end of the prism is provided on a bottom surface of the fixed base.

8. The lens prism module according to claim 1, wherein the driving assembly comprise a first driving component for driving the rotating base to rotate and second driving components for driving the fixed base to rotate; the first driving component comprises a first driving coil and a first driving magnet.

9. The lens prism module according to claim 8, wherein the second driving components comprise second driving coils disposed on a fixed base and second driving magnets disposed on the mounting base; the second driving coils disposed opposite to the second driving magnets.

10. The lens prism module according to claim 9, wherein the lens prism module further comprises a first Hall sensor disposed on the fixed base and a second Hall sensor disposed on the fixed base; the first Hall sensor is disposed on one side of the first driving coil; the second Hall sensor is disposed on one side of the second driving coil.

\* \* \* \* \*